United States Patent
Ikeda et al.

(10) Patent No.: US 8,471,983 B2
(45) Date of Patent: Jun. 25, 2013

(54) POLARIZING ELEMENT AND LIQUID CRYSTAL DISPLAY DEVICE

(75) Inventors: Yoshinori Ikeda, Hino (JP); Takashi Shiro, Hino (JP)

(73) Assignee: Teijin Limited, Osaka (JP)

( * ) Notice: Subject to any disclaimer, the term of this patent is extended or adjusted under 35 U.S.C. 154(b) by 348 days.

(21) Appl. No.: 12/518,225

(22) PCT Filed: Dec. 19, 2007

(86) PCT No.: PCT/JP2007/074384
§ 371 (c)(1),
(2), (4) Date: Jun. 8, 2009

(87) PCT Pub. No.: WO2008/078618
PCT Pub. Date: Jul. 3, 2008

(65) Prior Publication Data
US 2010/0045902 A1     Feb. 25, 2010

(30) Foreign Application Priority Data
Dec. 27, 2006   (JP) .................................. 2006-351770
Dec. 28, 2006   (JP) .................................. 2006-355001

(51) Int. Cl.
*G02F 1/13363*    (2006.01)

(52) U.S. Cl.
USPC .................. 349/96; 349/64; 349/67; 349/95; 349/118; 349/122; 349/158

(58) Field of Classification Search
USPC ............................................. 349/96; 359/488
See application file for complete search history.

(56) References Cited

U.S. PATENT DOCUMENTS

| | | | | |
|---|---|---|---|---|
| 2,447,828 A | * | 8/1948 | West | 359/489.09 |
| 3,610,729 A |   | 10/1971 | Rogers | |
| 5,559,634 A |   | 9/1996 | Weber | |
| 5,917,565 A | * | 6/1999 | Suzuki | 349/65 |
| 6,157,490 A | * | 12/2000 | Wheatley et al. | 359/589 |
| 2004/0080938 A1 | * | 4/2004 | Holman et al. | 362/231 |
| 2005/0120524 A1 | * | 6/2005 | Merrill et al. | 26/71 |
| 2006/0204720 A1 | * | 9/2006 | Biernath et al. | 428/156 |

FOREIGN PATENT DOCUMENTS

| | | |
|---|---|---|
| JP | 08-271731 A | 10/1996 |
| JP | 2000-506994 A | 6/2000 |
| JP | 2003-222726 A | 8/2003 |
| JP | 2003-240956 A | 8/2003 |
| JP | 2003-337224 A | 11/2003 |
| JP | 2004-078234 A | 3/2004 |
| JP | 2004-133220 A | 4/2004 |
| JP | 2006-220879 A | 8/2006 |
| WO | 92/22838 A1 | 12/1992 |
| WO | 97/32227 A1 | 9/1997 |

* cited by examiner

*Primary Examiner* — Mark Robinson
*Assistant Examiner* — Andrew Jordan
(74) *Attorney, Agent, or Firm* — Sughrue Mion, PLLC

(57) ABSTRACT

A polarizing element is provided that can serve as a reflective polarizing element, can be produced with relative ease, and is not problematic in terms of strength. Further, the polarizing element can maintain the intensity and the propagation direction of the light that has passed through the polarizing element. Further, a liquid crystal display device is provided that can use light with improved efficiency with the use of the polarizing element. Specifically, the polarizing element includes a plurality of specifically angled, polygonal prisms on a surface of a substantially uniaxial sheet having an in-plane optical axis, and an optically transparent resin layer having a refractive index substantially the same as the fast-axis refractive index of the sheet, and that coats the prisms.

17 Claims, 3 Drawing Sheets

POLARIZING ELEMENT AND LIQUID CRYSTAL DISPLAY DEVICE

TECHNICAL FIELD

The present invention relates to a polarizing element that selectively transmits only a specific polarized component of incident light, and to a liquid crystal display device including such a polarizing element.

BACKGROUND ART

There have been active researches directed to separating only specific polarized light from ordinary light, and various forms of polarizing elements have been developed to this end. Among these polarizing elements are, for example, birefringent polarizing elements that use birefringent (optically anisotropic) crystals such as calcite; dichroic polarizing elements in which a dichroic pigment or an organic pigment (dye) such as iodine is orientationally dispersed in a polymer; and reflective polarizing elements of the property to reflect polarized light of one direction with the use of an element such as a multilayered film of a controlled refractive index. The dichroic polarizing element, with its high dichroic properties, enables control of transmitted light, and therefore has been suitably used for liquid crystal display devices, one application of the polarizing element.

However, while the dichroic polarizing element transmits 50% of all incident light (maximum transmittance of 46% by excluding 4% surface reflection), it absorbs a component having an azimuth perpendicular to the transmitted light. Because 50% of the light is lost, the dichroic polarizing element is not satisfactory in terms of efficient use of light.

To avoid such absorption of light in the dichroic polarizing element and improve the efficiency of using light, attempts have been made to use the dichroic polarizing element in combination with a reflective polarizing element. This method attempts to improve the efficiency of using light by retroreflecting the light perpendicular to the transmission axis and absorbed by the polarizing element.

As used herein, the "reflective polarizing element" basically refers to an element that utilizes the optical reflection and interference properties, and that takes advantage of the reflecting property to separate polarized light that would otherwise be lost by being absorbed by the dichroic polarizing plate.

A known example is a reflective polarizing element that uses a cholesteric liquid crystal layer and a ¼ wavelength plate in combination (see Patent Document 1). In the reflective polarizing element described in Patent Document 1, the cholesteric liquid crystal layer has the property to transmit right- (or left-) circularly polarized light, and reflect left- (right-) circularly polarized light of a wavelength corresponding to its spiral pitch. The ¼ wavelength plate then converts the transmitted circularly polarized light to linearly polarized light, selectively producing linearly polarized light.

Further, Patent Document 2 describes a reflective polarizing element that utilizes the interference of a birefringent multilayered film. In the reflective polarizing element of Patent Document 2, the polarized light is separated by an oriented multilayered film of two kinds of polymer films made of birefringent material. The oriented multilayered film is commercially available from 3M under the trade name D-BEF (brightness enhancement film) series.

Patent Document 3 proposes a method of polarization separation, sharing the same principle as the method of Patent Document 2, in which a continuous phase and a discontinuous phase are created with the use of a simple polymer blend.

Further, Patent Document 4 proposes a polarizing element that uses a birefringent material and prisms in combination. The polarizing element described in Patent Document 4 is structured to include prisms on a surface of a birefringent polymer substrate. The prism angle is set so that one linearly polarized light component is reflected at the prism with an angle smaller than the critical angle, and that the other linearly polarized light component is reflected at the prism with an angle equal to or greater than the critical angle, taking advantage of a difference in refractive index between the cross sectional direction and the lengthwise direction of the prisms. With this setting, total reflection occurs for the light equal to or greater than the critical angle, reflecting it back to the incident light side, and thereby separating the polarized light.

[Patent Document 1] JP-A-8-271731
[Patent Document 2] U.S. Pat. No. 3,610,729
[Patent Document 3] JP-T-2000-506994 (the term "JP-T" as used herein means a published Japanese translation of a PCT patent application)
[Patent Document 4] JP-A-2006-220879

DISCLOSURE OF THE INVENTION

Problems that the Invention is to Solve

However, with the reflective polarizing element described in Patent Document 1, it is difficult to realize the intended properties over the whole visible range. Another problem is the interlayer detachment that readily occurs because of the weak bonding strength between the interface layers of the cholesteric liquid crystal layer.

Regarding D-BEF described in Patent Document 2, the polarization characteristics must be maintained over the visible range (400 nm to 800 nm). For this, a total of about 800 layers needs to be laminated, and the thickness must be varied successively. Beside the lamination and the thickness control of the several hundred layers of polymer film, the refractive index needs to be controlled for each layer, and the properties must be uniformly controlled in the width direction of the film. Accordingly, production of the polarizing element using the multilayered film of Patent Document 2 requires intricate techniques and a high work load for manufacture. D-BEF is also problematic in terms of deformation caused by the characteristic expansion and contraction of the polymer.

In the method using a polymer blend described in Patent Document 3, the refractive index of the blend polymer (polymer forming the discontinuous phase) must precisely match the refractive index of the bulk base polymer (polymer forming the continuous phase). Thus, manufacture of the polarizing element described in Patent Document 3 involves great difficulties.

Further, in the polarizing element described in Patent Document 4, the linearly polarized light component is not entirely transmitted even when it has an angle of incidence smaller than the critical angle. The linearly polarized light component with an angle of incidence smaller than the critical angle is split into transmitted light and reflected light at the prism interface according to Snell's law, and the reflected light is returned to the incident light side by the prisms. Accordingly, in the polarizing element of Patent Document 4, the intensity of the transmitted light is smaller than the intensity of the linearly polarized light component entering the prisms with an angle of incidence smaller than the critical angle. Further, because the transmitted light is further refracted at the prism/air interface according to Snell's law, the diffused state of the incident light cannot be maintained, and must be re-designed.

In sum, the reflective polarizing element, when combined with an absorptive polarizing element, can improve the efficiency of using light in the liquid crystal display device, and is highly useful in this regard. However, the reflective polarizing element still accompanies technical difficulties regarding performance and production.

The present invention was made in view of the foregoing problems, and it is an object of the present invention to provide a polarizing element that can serve as a reflective polarizing element, can be produced with relative ease, and is not problematic in terms of strength. The polarizing element can also maintain the intensity and the propagation direction of the light that has passed through the polarizing element.

Another object of the invention is to provide a liquid crystal display device that can improve the efficiency of using light with the use of the polarizing element.

Means for Solving the Problems

The inventors of the present invention conducted intensive studies to solve the foregoing problems, and found that the problems can be solved by forming a plurality of specifically angled, polygonal prisms on a surface of a substantially uniaxial sheet having an in-plane optical axis, and coating the prisms with an optically transparent resin layer having a refractive index substantially the same as the fast-axis refractive index of the sheet. The present invention was completed based on this finding.

Specifically, the present invention is a polarizing element including a prism sheet and an optically transparent resin layer, wherein the prism sheet is a substantially uniaxial sheet having an in-plane optical axis, and includes a plurality of prisms of a polygonal cross section on at least one of its surfaces, wherein an angle made by a slanted surface of the prisms and a plane of the prism sheet including a slow axis and a fast axis is equal to or greater than a critical angle based on a slow-axis refractive index and a fast-axis refractive index of the prism sheet, wherein the optically transparent resin layer is optically isotropic, and has a refractive index substantially the same as the fast-axis refractive index of the prism sheet, and wherein the prisms are coated with the optically transparent resin layer.

In another aspect, the present invention is a liquid crystal display device including a first polarizing plate, a liquid crystal cell, a second polarizing plate, and a light source, wherein the first polarizing plate, the liquid crystal cell, the second polarizing plate, and the light source are disposed in this order, wherein a polarizing element of the present invention is disposed between the second polarizing plate and the light source, and wherein the fast axis of the prism sheet and a transmission axis of the second polarizing plate are disposed substantially parallel to each other.

Advantage of the Invention

A polarizing element of the present invention can serve as a reflective polarizing element, can improve the efficiency of using light, can be produced with relative ease, and is not problematic in terms of strength. The polarizing element can also maintain the intensity and the propagation direction of the light that has passed through the polarizing element.

Thus, by laminating a polarizing element of the present invention on other optical layers having optical functions, optical components can be provided that have a variety of functions. For example, a polarizing element of the present invention can be combined with a dichroic polarizing element, a retardation film, or an optical compensation film to provide components such as a circularly polarizing film, an elliptically polarizing film, and a viewing angle enhancing polarizing film.

Further, by combining a polarizing element of the present invention with a liquid crystal cell sandwiched between dichroic polarizing elements, a liquid crystal display device can be obtained that has improved brightness and reduced power consumption.

DESCRIPTION OF REFERENCE NUMERALS AND SIGNS

Figure 1:
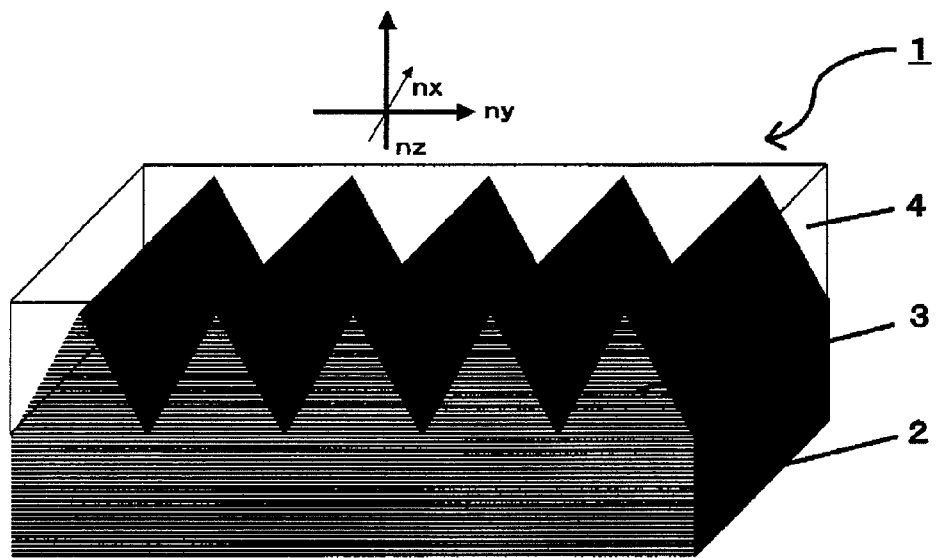
FIG. 1 is a perspective view of a polarizing element 1 of the First Embodiment of the present invention.

1: Polarizing element
2: Prism sheet
3: Prism
4: Optically transparent resin layer
11: Polarizing element
12: Prism sheet
13: Prism
14: Convex structure
15: Optically transparent resin layer

BEST MODE FOR CARRYING OUT THE INVENTION

Polarizing Element

A polarizing element of the present invention is a substantially uniaxial sheet having an in-plane optical axis, wherein the polarizing element includes a plurality of specifically angled, polygonal prisms on at least one surface of the sheet, and wherein the prisms are coated with an optically transparent resin layer having a refractive index substantially the same as the fast-axis refractive index of the sheet.

Figure 2:
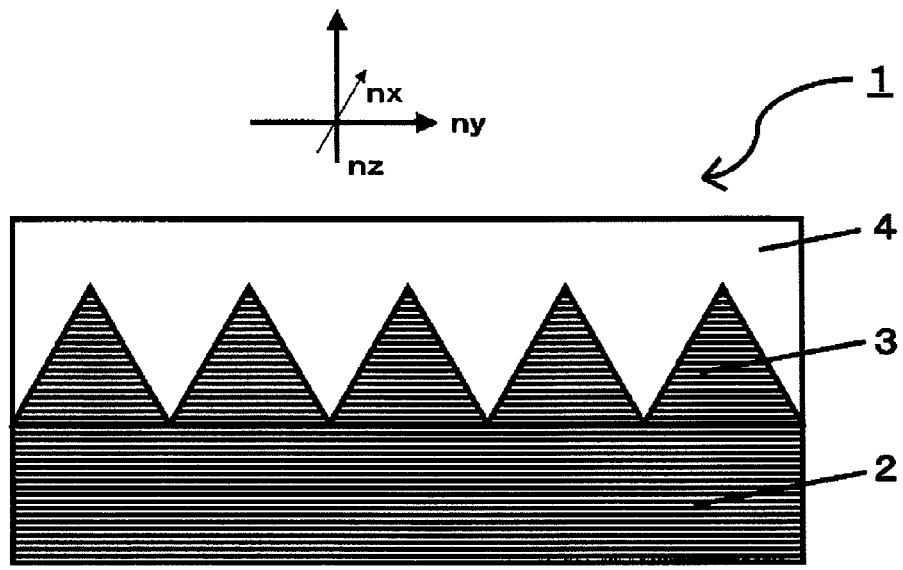
FIG. 2 is a cross sectional view of the polarizing element 1 of the First Embodiment of the present invention.

FIG. 1 and FIG. 2 are diagrams representing a polarizing element 1 (First Embodiment) as an exemplary embodiment of the present invention. A polarizing element 1 according to the present embodiment includes a prism sheet 2 having a plurality of prisms 3 on one of its surfaces, and an optically transparent resin layer 4. The prisms 3 are columnar in shape and disposed substantially parallel to one another. The cross section of each prism 3 is a triangle.

A polarizing element of the present invention may be a substantially uniaxial sheet having an in-plane optical axis, wherein the polarizing element includes a plurality of specifically angled, polygonal prisms on one surface of the sheet, and a plurality of convex structures of a curved cross section on the other surface, and wherein the prisms and the convex structures are coated with an optically transparent resin layer having a refractive index substantially the same as the fast-axis refractive index of the sheet.

Figure 3:
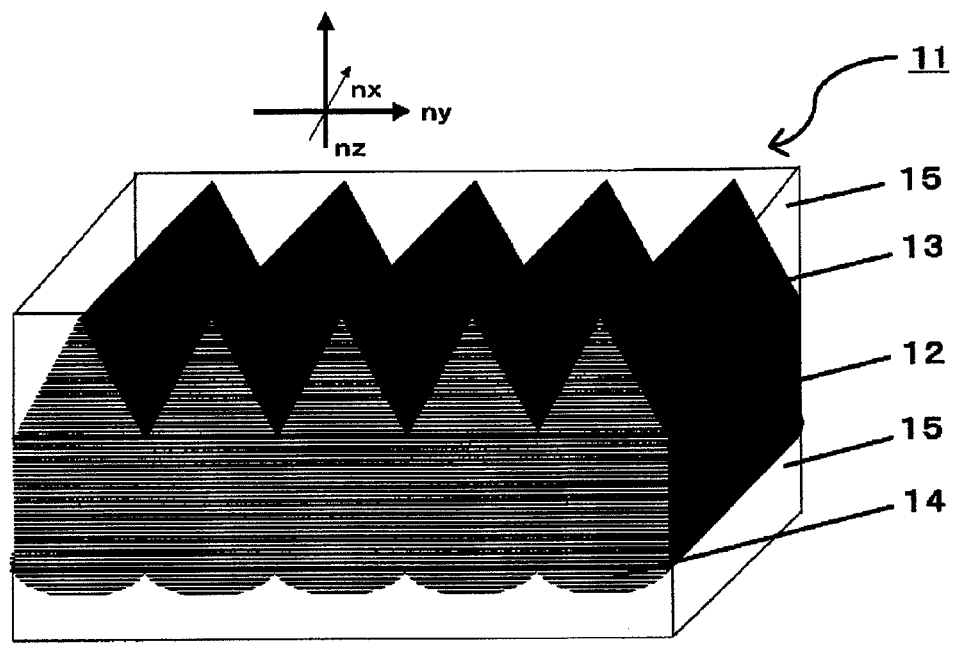
FIG. 3 is a perspective view of a polarizing element 11 of the Second Embodiment of the present invention.
Figure 4:
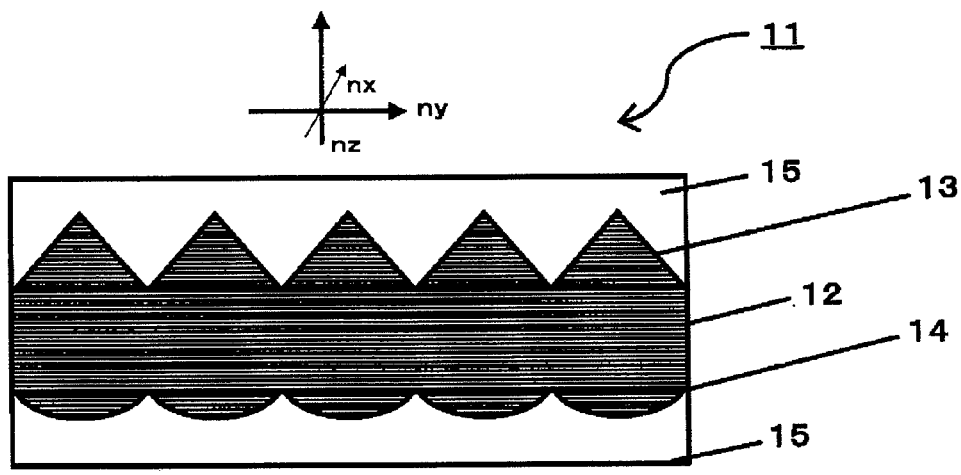
FIG. 4 is across sectional view of the polarizing element 11 of the Second Embodiment of the present invention.

FIG. 3 and FIG. 4 are diagrams representing a polarizing element 11 (Second Embodiment) as another exemplary embodiment of the present invention. A polarizing element 11 according to this embodiment includes a prism sheet 12 having a plurality of prisms 13 and a plurality of convex structures 14 on its surfaces, and an optically transparent resin layer 15. The prisms 13 are columnar in shape and disposed substantially parallel to one another. The cross section of each prism 13 is a triangle. The convex structures 14 are columnar, convex lens-like structures disposed substantially parallel to one another. The cross section of each convex structure 14 is a semi-ellipsoid. The prisms 13 and the convex structures 14 have the same column direction.

Note that the present invention is not limited to these embodiments.

A polarizing element of the present invention has a thickness in a range of preferably from 50 μm to 400 μm, more preferably from 60 μm to 300 μm, and particularly preferably 70 μm to 250 μm, all inclusive. A thickness below 50 μm makes it difficult to accurately fabricate the prism configurations on the sheet surface. This makes it difficult to realize the polarization separating function of the present invention. A thickness below 50 μm is also not preferable in terms of handling. On the other hand, a thickness above 400 μm tends to cause defects, such as cracking, when the product reflective polarizing element is bent, preventing use of the polarizing element as a roll. Cutting of the polarizing element also becomes difficult.

The following describes how a polarizing element of the present invention imparts the reflective polarization separating function, along with other configurations such as structure and manufacturing method, with reference to the polarizing element 1 of the First Embodiment (FIG. 1 and FIG. 2), and the polarizing element 11 of the Second Embodiment (FIG. 3 and FIG. 4).

Polarization Separating Method by Polarizing element of the Present Invention

First Embodiment

In the polarizing element 1 of the First Embodiment of the present invention (FIG. 1 and FIG. 2), substantially perpendicularly incident light on the surface (bottom face of the prism sheet 2) opposite from the surface provided with prisms 3 (top surface of the prism sheet 2) is separated into s-polarized light and p-polarized light by being selectively transmitted or reflected at the interface between the prisms 3 and the optically transparent resin layer 4.

The polarizing element 1 of the First Embodiment is adapted so that the reflective polarization separating characteristic of the present invention can be enhanced when light is incident substantially perpendicularly from the surface of the prism sheet 2 (bottom surface of the prism sheet 2) opposite from the surface provided with the prisms 3 (top surface of the prism sheet 2).

The following described how a polarizing element of the present invention imparts the reflective polarization separating function, with reference to the polarizing element 1 of the First Embodiment (FIG. 1 and FIG. 2).

The prism sheet 2 forming the polarizing element 1 of the First Embodiment is formed from a substantially uniaxial polyethylenenaphthalate stretched film having an in-plane optical axis. The slow axis of the prism sheet 2 is substantially parallel to the column direction of the prisms 3, and the fast axis is substantially perpendicular to the column direction of the prisms 3 (i.e., along the cross section of the prisms 3). The refractive index is 1.78 in the slow axis direction, and 1.54 in the fast axis direction, making the in-plane maximum refractive index difference 0.24. The critical angle of incidence from the refractive index 1.78 to 1.54 (refractive index difference of 0.24) can be calculated as 59.9°.

Further, in the polarizing element 1 of the First Embodiment, the surface of the prisms 3 on the top surface of the prism sheet 2 is coated with the optically transparent resin layer 4 having a refractive index of 1.54 (the same refractive index as the fast-axis refractive index of the prism sheet 2).

The angle (prism base angle) between the hypotenuse of the prisms 3 and the bottom surface of the prism sheet 2 (the plane of the prism sheet including the slow axis and the fast axis) is set to 60°, so that it is not below the critical angle (59.9°) calculated from the in-plane maximum refractive index difference.

The following considers substantially perpendicularly incident light on the bottom surface of the prism sheet 2 of the polarizing element 1 of this embodiment. The polarized components of the incident light are defined as p-polarized light for the polarized component along the fast axis of the prisms 3 (substantially perpendicular to the column direction of the prisms 3; the direction along the cross section of the prisms 3), and s-polarized light for the polarized component along the slow axis of the prisms 3 (the column direction of the prisms 3).

Consider p-polarized light incident on the polarizing element 1 of the First Embodiment. In this case, because the refractive index 1.54 along the fast axis of the prism sheet 2 is the same as the refractive index 1.54 of the optically transparent resin layer 4, the interface between the prisms 3 and the optically transparent resin layer 4 of the polarizing element 1 is regarded as being transparent, and the p-polarized light passes through the polarizing element 1.

On the other hand, there is a critical angle for s-polarized light incident on the polarizing element 1. Because the refractive index along the slow axis of the prism sheet 2 is 1.78, and the refractive index of the optically transparent resin layer 4 is 1.54, the light traveling from the prism sheet 2 to the optically transparent resin layer 4 passes from a medium of larger refractive index to a medium of smaller refractive index. The critical angle for the refractive index difference of 0.24 in the First Embodiment is 59.9°, as noted above. Since the prism base angle (the angle made by the hypotenuse of the prisms 3 and the bottom surface of the prism sheet 2 (the plane of the prism sheet including the slow axis and the fast axis)) is 60° in the polarizing element 1 of the First Embodiment, the angle of s-polarized light incident at the interface between the prisms 3 and the optically transparent resin layer 4 is 60°. Because the angle of incidence is not below the critical angle, total reflection occurs.

The totally reflected s-polarized light component is incident on another slanted surface of the prisms 3 at right angle, and passes through the prisms 3 except for the component reflected at the surface. The surface reflected component is reflected back in the opposite direction into the path of the incident light, and returns toward the incident light side.

After passing through the prisms 3, the s-polarized light component that passed through another slanted surface of the prisms 3 propagates through the optically transparent resin layer 4, and reaches the interface between the optically transparent resin layer 4 and air. Here, because the refractive index of the optically transparent resin layer 4 is 1.54, and that of air is 1.00, there is a critical angle for the incident light passing from the high-refractive-index medium to the low-refractiveindex medium. The critical angle for the refractive index difference of 0.54 is 40.5°. The light that has passed through another slanted surface of the prisms 3 toward the optically transparent resin layer 4 has an angle of incidence sufficiently larger than the critical angle at the interface between the optically transparent resin layer 4 and air. Thus, the light is totally reflected at the interface and returns into the prisms 3. The light returned to the prisms 3 is totally reflected again at the interface between the optically transparent resin layer 4 and the prisms 3, and returns toward the incident light side.

In sum, the polarizing element 1 of the First Embodiment works under the foregoing principle to transmit p-polarized light, but does not transmit s-polarized light, and instead reflects s-polarized light back to the incident light side. In this way, light is separated into p-polarized light and s-polarized light, and the component returned to the incident light side can be reused to improve the efficiency of using light.

Second Embodiment

In the polarizing element 11 according to the Second Embodiment of the present invention (FIG. 3 and FIG. 4), the polarized component contained in the incident light on the side provided with the convex structures 14, and that is parallel to the slow axis of the prism sheet 12 is converged substantially perpendicular to the plane of the prism sheet 12 including the slow axis and the fast axis. The condensed light is redirected by reflecting at the interface between the prisms 13 and the optically transparent resin layer 15, and passes through the prism sheet 12 before it is reflected at the interface between the optically transparent resin layer 15 and air and returns to the incident light side.

The prism sheet 12 is a transparent body for the polarized component contained in the incident light on the side provided with the convex structures 14, and that is parallel to the fast axis of the prism sheet 12, because the refractive index of the optical resin layer 15 is substantially the same as the refractive index along the fast axis of the prism sheet 12. As such, the polarized component parallel to the fast axis of the prism sheet 12 passes through the polarizing element 11 without being condensed by the convex structures 14 and reflected by the prisms 13. In this manner, the incident light is separated into a transmitted component and a reflected component, i.e., s-polarized light and p-polarized light.

The polarizing element 11 of the Second Embodiment is adapted so that the reflective polarization separating characteristic of the present invention can be enhanced when the path of the light that enters the prisms 13 is substantially perpendicular to the plane of the prism sheet 12 including the slow axis and the fast axis.

That is, the polarizing element 11 of the Second Embodiment including the prism sheet 12 provided with the prisms 13 and the convex structures 14 on its surfaces can selectively transmit only a specific polarized component of incident light from a diffused light source.

The following describes how a polarizing element of the present invention imparts the reflective polarization separating function, with reference to the polarizing element 11 of the Second Embodiment (FIG. 3 and FIG. 4).

The prism sheet 12 forming the polarizing element 11 of the Second Embodiment is formed from a substantially uniaxial polyethylenenaphthalate stretched film having an in-plane optical axis. The slow axis of the prism sheet 12 is substantially parallel to the column directions of the prisms 13 and the convex structures 14, and the fast axis is substantially perpendicular to the column directions of the prisms 13 and the convex structures 14 (i.e., along the cross section of the prisms 13). The refractive index is 1.78 in the slow axis direction, and 1.54 in the fast axis direction, making the in-plane maximum refractive index difference 0.24. The critical angle of incidence from the refractive index 1.78 to 1.54 (refractive index difference of 0.24) can be calculated as 59.9°.

Further, in the polarizing element 11 of the Second Embodiment, the surface of the prisms 13 on the top surface of the prism sheet 12, and the surface of the convex structures 14 on the bottom surface of the prism sheet 12 are coated with the optically transparent resin layer 15 having a refractive index of 1.54 (the same refractive index as the fast-axis refractive index of the prism sheet 12).

The angle (prism base angle) between the hypotenuse of the prisms 13 and the plane of the prism sheet 12 including the slow axis and the fast axis (prism base angle) is set to 60°, so that it is not below the critical angle (59.9°) calculated from the in-plane maximum refractive index difference.

The following considers incident light on the convex structure 14 side of the prism sheet 12 of the polarizing element 11 of this embodiment. The polarized components of the incident light are defined as p-polarized light for the polarized component along the fast axis of the prisms 13 (substantially perpendicular to the column direction of the prisms 13; the direction along the cross section of the prisms 13), and s-polarized light for the polarized component along the slow axis of the prisms 13 (the column direction of the prisms 13).

First, the s-polarized light component of the incident light is considered. The s-polarized light component enters the optically transparent resin layer 15 on the convex structure 14 side of the prism sheet 12, and reaches the interface between the optically transparent resin layer 15 and the convex structures 14 of the prism sheet 12. Here, according to Snell's law, refraction occurs at the interface between the optically transparent resin layer 15 and the convex structures 14. In the polarizing element 11 of the Second Embodiment, the convex structures 14 are a form of convex lenses. Thus, by the lens effect, incident light can be refracted to increase the component oriented substantially perpendicular to the plane of the prism sheet 12 including the slow axis and the fast axis, even when the incident light is from a diffused light source and has various angles of incidence, for example.

The s-polarized light component refracted at the interface between the optically transparent resin layer 15 and the convex structures 14 to increase the component substantially perpendicular to the plane of the prism sheet 12 including the slow axis and the fast axis propagates through the prism sheet 12, and reaches the interface between the prisms 13 and the optically transparent resin layer 15.

Here, because the refractive index along the slow axis of the prism sheet 12 is 1.78, and the refractive index of the optically transparent resin layer 15 is 1.54, the light traveling from the prism sheet 12 to the optically transparent resin layer 15 passes from a medium of larger refractive index to a medium of smaller refractive index, and therefore there is a critical angle for the s-polarized light component incident at the interface between the prisms 13 and the optically transparent resin layer 15. The critical angle for the refractive index difference of 0.24 in the Second Embodiment is 59.9°, as noted above. Since the prism base angle (the angle made by the hypotenuse of the prisms 13 and the plane of the prism sheet 12 including the slow axis and the fast axis) is 60° in the polarizing element 11 of the Second Embodiment, the angle of s-polarized light component incident at the interface between the prisms 13 and the optically transparent resin layer 15 is 60°. Because the angle of incidence is not below the critical angle, total reflection occurs.

The totally reflected s-polarized light component is incident on another slanted surface of the prisms 13 at right angle, and passes through the prisms 13 except for the component reflected at the surface. The surface reflected component is reflected back in the opposite direction into the path of the incident light, and returns toward the incident light side.

After passing through the prisms 13, the s-polarized light component that passed through another slanted surface of the prisms 13 propagates through the optically transparent resin layer 15, and reaches the interface between the optically transparent resin layer 15 and air. Here, because the refractive index of the optically transparent resin layer 15 is 1.54, and that of air is 1.00, there is a critical angle for the incident light passing from the high-refractive-index medium to the low-refractive-index medium. The critical angle for the refractive index difference of 0.54 is 40.5°. The light that has passed through another slanted surface of the prisms 13 toward the optically transparent resin layer 15 has an angle of incidence sufficiently larger than the critical angle at the interface between the optically transparent resin layer 15 and air. Thus, the light is totally reflected and returns into the prisms 13. The light returned to the prisms 13 is totally reflected again at the interface between the optically transparent resin layer 15 and the prisms 13, and returns toward the incident light side.

Regarding the p-polarized light component of the incident light, because the refractive index 1.54 of the prism sheet 12 along the fast axis is the same as the refractive index 1.54 of the optically transparent resin layer 15, the interface between the prism sheet 12 and the optically transparent resin layer 15 is regarded as being transparent for the p-polarized light component incident thereon, and the p-polarized light passes through the polarizing element 11.

In sum, the polarizing element 11 of the Second Embodiment works under the foregoing principle to transmit p-polarized light, but does not transmit s-polarized light, and instead reflects s-polarized light back to the incident light side. In this way, light is separated into p-polarized light and s-polarized light, and the component returned to the incident light side can be reused to improve the efficiency of using light.

A polarizing element of the present invention is not limited to the foregoing First and Second Embodiments, as long as one of the s- and p-polarized light components is directly transmitted, and the other, non-transmitted polarized component is totally reflected and passes through the prism into the optically transparent resin layer before it is totally reflected again at the interface between the optically transparent resin layer and air. The polarization separating function of the present invention can be realized by a polarizing element satisfying these conditions. The polarizing element having the reflective polarization separating function of the present invention can be designed by appropriately setting parameters such as the material of the prism sheet, optical anisotropy, the shape of the prisms, and the material of the optically transparent resin layer.

The prism sheet forming a polarizing element of the present invention needs to include the polygonal prisms on at least one of its surfaces, and the shape of the other surface is not particularly limited as long as the foregoing conditions for reflection are satisfied. For example, for the purposes of controlling the path of incident light and imparting the condensing effect, concave or convex polygonal prisms (second prisms), or convex structures such as lenses (for example, the Second Embodiment) may be formed.

When forming structures such as second prisms or lenses, the prism sheet may be processed to form structures on the both surfaces at once, or structures such as second prisms or lenses may be formed on the flat surface of the prism sheet not provided with the prisms, using optically anisotropic or optically isotropic material, after processing the other surface to form the prisms.

When forming structures such as second prisms or lenses on the other surface, the structure may be or may not be coated with the optically transparent resin layer. The optically transparent resin used for the second prisms, lenses, or other structures formed on the other surface may be either birefringent or optically isotropic. However, the shape of the structures must be appropriately designed to alter the diffused state of incident light to a required state.

When forming structures such as second prisms or lenses, and coating these structures with the optically transparent resin layer, structures such as concave or convex polygonal prisms, or convex structures such as lenses may be further provided on the outer side of the optically transparent resin layer on the side of the second prisms, lenses, or other structures, in order to control the path of incident light or impart more condensing effect. These additional structures, such as prisms or lenses, may be or may not be coated with the optically transparent resin layer. The optically transparent resin used for these structures may be either birefringent or optically isotropic. However, the shape of the structures must be appropriately designed to alter the diffused state of incident light to a required state.

[Prism Sheet]

The prism sheet forming a polarizing element of the present invention is a substantially uniaxial sheet having an in-plane optical axis, and includes a plurality of prisms of a polygonal cross section on at least one of its surfaces.

As used herein, the "optical axis" is referred to in the context of optically anisotropic birefringent crystals, and it is the direction in which the refractive index is constant, and in which birefringence does not occur upon incidence of unpolarized light. Generally, "optically anisotropic" materials include those that undergo changes in optical properties in response to external influences such as external force or voltage, or magnetic field applied in a certain direction. However, the prism sheet used in the present invention exhibits optical anisotropy under no external influence, or more specifically, it is a sheet having birefringence.

Further, the "substantially uniaxial sheet having an in-plane optical axis" refers to a sheet in which the refractive indices $n_x$, $n_y$, and $n_z$ along the x-, y-, and z-axes of the x, y, z coordinate system are related so that $n_x > n_y \approx n_z$, or $n_y > n_x \approx n_z$, where x and y lie in the film plane, and z is orthogonal to the x-y plane. In the x-y plane, the axis with the greater of the refractive indices $n_x$ and $n_y$ is the slow axis, and the axis with the smaller refractive index is the fast axis.

In the prism sheet forming a polarizing element of the present invention, the difference between the slow-axis refractive index and the fast-axis refractive index (in-plane maximum refractive index difference) is preferably 0.15 or more, more preferably 0.20 or more, and particularly preferably 0.24 or more. In thermoplastic resin, the critical angle calculated from the refractive index difference almost always becomes less than 60° when the in-plane refractive index difference is 0.24. Thus, with an in-plane maximum refractive index difference of 0.24, the prisms can have an equilateral triangular cross section, making it possible to provide a high polarized light separation performance with a simple prism structure.

The substantially uniaxial sheet having an in-plane optical axis can be made of, for example, inorganic materials. Examples include crystals of the anisotropic crystal system, such as calcite ($CaCO_3$), quartz ($SiO_2$), rutile ($TiO_2$), and lithium niobate (LiNbO$_3$). It is also possible to use organic materials, such as, for example, a liquid crystal phase or polymer materials in which the molecular chains are oriented in the same direction. In the present invention, the polymer materials are preferable, in terms of properties such as heat stability, ease of handling, and processability.

The polymer material used in the present invention may be materials that are optically isotropic unless subjected to some kind of orientation treatment, excluding those with polymer chains having unique orientation characteristics such as self-assembly. The orientation treatment that renders the polymer material optically anisotropic (birefringent) may employ a method in which a polymer material is applied over the rubbed surface after rubbing, or a stretching method, among others. The orientation treatment gives different refractive indices in directions parallel to and orthogonal to the processed direction within the plane subjected to the orientation treatment, rendering the polymer material optically anisotropic (birefringent). The orientation treatment that renders the polymer material optical anisotropic (birefringent) is not particularly limited. However, stretching is preferable because it enables the material to be uniformly processed over a large area, and therefore provides high productivity.

The polymer material used in the present invention is not particularly limited. However, thermoplastic resin is preferable in terms of ease of stretching. Examples include aromatic polyesters such as polyethylene terephthalate, polybutylene terephthalate, and polyethylenenaphthalate; methacrylates such as polycarbonate and polymethylmethacrylate; polyvinyl ethers; polyolefins such as polyethylene and polypropylene; polystyrenes; and aliphatic polyamides such as nylon 6.

Generally, polymer materials that easily exhibit optical anisotropy (birefringence) are those having molecular chains with a highly polarizable backbone (for example, an aromatic ring or the like), and in which the molecular chains show a high degree of orientation in response to stretching. From this standpoint, polycarbonate, polyethylene terephthalate, and polyethylenenaphthalate are preferable, and polyethylenenaphthalate, having an excellent tendency to exhibit birefringence, is particularly preferable.

[Prisms]

The prism sheet forming a polarizing element of the present invention includes a plurality of prisms of a polygonal cross section on at least one of its surfaces. The use of the prism sheet avoids problems involving manufacture of the polarizing element, such as precise control of refractive index, and control of multilayer lamination, that occur in a birefringent multilayer structure film (D-BEF), or a polymer blend film that incorporates a continuous phase and a discontinuous phase.

In the polarizing element 1 of the First Embodiment illustrated in FIG. 1, the prisms 3 are columnar in shape and disposed substantially parallel to one another. The cross section of each prism 3 is a triangle. The slow axis of the prism sheet 2 is substantially parallel to the column direction of the prisms 3, and the fast axis is substantially perpendicular to the column direction of the prisms 3 (i.e., along the cross section of the prisms 3). The refractive index along the slow axis is 1.78, and the refractive index along the fast axis is 1.54, making the in-plane maximum refractive index difference 0.24. The critical angle for incident light traveling from the refractive index 1.78 to 1.54 (the refractive index difference of 0.24) can be calculated as 59.9.

The cross section of the triangular prisms 3 is a 60°-angle equilateral triangle, so that the angle (prism base angle) made by the hypotenuse of the prisms 3 and the plane of the prism sheet 2 including the slow axis and the fast axis is equal to or greater than the critical angle (59.9°)

In the prism sheet 2 of the First Embodiment, the perpendicularly incident light on the surface (the bottom surface of the prism sheet 2) opposite the surface provided with the prisms 3 (the top surface of the prism sheet 2) propagates through the prism sheet 2 and strikes the prisms 3. Here, the s-polarized light is incident at an angle of 60° with respect to a direction normal to the interface between the prisms 3 and the optically transparent resin layer 4. Because the angle of incidence is not below the critical angle, the incident light is totally reflected.

By being totally reflected, s-polarized light propagates at a 60° angle with respect to the propagation direction (0°) of the incident light. The totally reflected incident light then perpendicularly falls on another surface of the prisms 3 and propagates through the prisms 3. Here, because the light is perpendicularly incident, the light travels in straight line without being refracted at the interface, except for the surface reflected component due to the refractive index difference.

The incident light that has passed through the prisms 3 propagates through the optically transparent resin layer 4, and falls on the interface between the optically transparent resin layer 4 and air at a 60° angle with respect to a direction normal to this interface. Here, because the critical angle for the incident light traveling from the optically transparent resin layer 4 to air is 40.5°, the incident light is totally reflected back toward the incident light source. This satisfies the requirement of "desired angle" reflection, which requires a reflection angle of at least 45° and less than 90° for the reflected light, with respect to the perpendicularly incident light on the plane of the prism sheet 2 including the slow axis and the fast axis (when the optically transparent resin layer is made of thermoplastic resin, and the thermoplastic resin has a refractive index of 1.45 or more), as will be described later. That is, the prism structure enables the s-polarized light component to return to the incident side.

By definition, the prism is a transparent body having two or more optical planes, and there is no parallelism, even by approximation, in at least one of its surface pairs. Generally, the prism is made of optically isotropic materials such as glass, and comes in various forms, such as a rectangular prism, an erect prism, and a pentaprism that are used to redirect a light ray by reflecting it. The basic geometry of the prisms used for spectral separation is that of a triangular prism, and this geometrical shape will be referred to also as a "prism configuration." In the prisms used in a polarizing element of the present invention, one side is integral to the sheet, and the upper surface of the prism sheet has irregularities whose cross section is polygonal.

It is preferable that the prisms be disposed substantially parallel to one another, because it provides a structure that enables light to be uniformly reflected over a surface. Further, the prisms are preferably columnar in shape, because it provides the same light reflecting characteristics along the lengthwise direction of the prisms. That is, in the present invention, it is particularly preferable to adopt a structure in which columnar prisms having a polygonal cross section are continuously and repeatedly disposed in parallel.

The cross sectional shape of the prisms of the prism sheet used in the present invention is not particularly limited, and may be any polygonal shape, as long as incident light on the prisms is reflected with a desired angle. However, it is preferable that the polygonal shape be triangular, because it is simple, and easy to fabricate. Accordingly, the prisms 3 of the prism sheet 2 of the embodiment illustrated in FIG. 1 are the most preferable embodiment of a polarizing element of the present invention.

Here, description is made as to the reflection with a "desired angle." In order for a polarizing element of the present invention to be functional, the perpendicularly incident light rays on the plane of the prism sheet including the slow axis and the fast axis must be reflected with an angle of at least 45° and less than 99°, with respect to the propagation direction (0°) of the perpendicular light rays (when the optically transparent resin layer is made of thermoplastic resin, and the thermoplastic resin has a refractive index of 1.45 or more). The light reflected in this angle range passes through the optically transparent resin layer coating the prisms, and strikes the interface between the optically transparent resin layer and air. Here, when the optically transparent resin layer is made of thermoplastic resin, and includes an aromatic ring in its molecular chain backbone, the lower limit of the refractive index of the optically transparent resin can be set to 1.45. When the refractive index of the optically transparent resin layer is 1.45, the critical angle for the light traveling from the optically transparent resin layer to air (refractive index=1.00) is 43.6°. That is, when the perpendicularly incident light rays on the plane of the prism sheet including the slow axis and the fast axis (direction of propagation is 0°) are reflected at the interface between the prisms and the optically transparent resin at an angle of at least 45° and less than 90°, the reflected light is totally reflected at the interface between the optically transparent resin layer and air, and returns to the incident side. This is the structure required to return the polarized component to the incident side using the prism structures.

[Convex Structures]

The prism sheet used for a polarizing element of the present invention may include a plurality of convex structures of a curved cross section on one of its surfaces (Second Embodiment). The convex structures serve as lenses, making it possible to refract and condense incident light in such a manner that the proportion of the component substantially perpendicular to the plane of the prism sheet including the slow axis and the fast axis is increased, even when the light is incident from a diffused light source at various angles.

In the polarizing element 11 (FIG. 3) of the Second Embodiment using the prism sheet that includes a plurality of convex structures of a curved cross section on one of its surfaces, the convex structures 14 are columnar in shape and disposed substantially parallel to one another. The cross section of the convex structures 14 is semi-elliptic. The slow axis of the prism sheet 12 is substantially parallel to the column direction of the convex structures 14, and the fast axis is substantially perpendicular to the column direction of the convex structures 14 (i.e., along the cross section of the convex structures 14).

In the Second Embodiment, the light incident on the convex structure 14 side of the prism sheet 12 enters the optically transparent resin layer 15 on the convex structures 14 side of the prism sheet 12, and reaches the interface between the prism sheet 12 and the convex structures 14. Here, according to Snell's law, refraction occurs at the interface between the optically transparent resin layer 15 and the convex structures 14. In the polarizing element 11 of the Second Embodiment, the convex structures 14 are a form of convex lenses. Thus, incident light can be refracted to increase the component oriented perpendicular to the plane of the prism sheet 12 including the slow axis and the fast axis, even when the incident light is from a diffused light source and has various angles of incidence, for example.

In the polarizing element 11 of the Second Embodiment, the convex structures 14 of the prism sheet 12 is covered with the optically transparent resin layer having a refractive index substantially the same as the fast-axis refractive index of the prism sheet 12. As such, the convex structures 14 are optically transparent and have no effect on the polarized light of the direction in which the refractive index is substantially the same. However, the convex structures 14 serve as lenses for the polarized light of the direction in which there is a refractive index difference from the optically transparent resin layer, because there is a refractive index interface in this case. Further, by coating the convex structures 14 of the prism sheet 12 with the optically transparent resin layer having a refractive index substantially the same as the fast-axis refractive index of the prism sheet 12, the retroreflectivity of the light returned by the prism configuration of the prism sheet can be improved by the lens effect.

That is, the polarizing element 11 of the Second Embodiment can simultaneously exhibit a first effect in which polarized light of the direction of substantially the same refractive index is allowed to pass through without changing the diffused state of the diffused light designed for incidence on the polarizing element, and a second effect of further improving the retroreflectivity of the light returned by the prism configuration.

The convex structures having a curved cross section may be of a lenticular lens type, for example. Further, the cross section of the convex structures may be, for example, parabolic, elliptic, circular, a combination of these shapes, or a semi-circular or semi-elliptic shape obtained by cutting these shapes in straight line.

It is preferable that the convex structures be disposed substantially parallel to one another, because it provides a structure that enables light to be uniformly refracted over a surface. Further, the convex structures are preferably columnar in shape, because it provides the same light reflecting characteristics along the lengthwise direction of the prisms. That is, in the present invention, when using a prism sheet that has a plurality of convex structures of a curved cross section, it is particularly preferable that the columnar convex structures having a curved cross section be continuously and repeatedly disposed in parallel.

Note that when using a prism sheet that has a plurality of convex structures of a curved cross section, it is preferable, in terms of manufacture and improving the polarization separating function, that the convex structures and the polygonal prisms have the same column direction.

[Producing Method of Prism Sheet]

The prism sheet forming a polarizing element of the present invention can be produced by the following representative methods. In one exemplary method, a sheet is prepared, and the prism configuration and, optionally, the convex structures are fabricated before stretching the sheet, for example, along the column direction of the prisms. In another exemplary method, a sheet is prepared, and stretched before fabricating the prism configuration and, optionally, the convex structures. In yet another exemplary method, a sheet is stretched after fabricating either the prism configuration or the convex structures, and before fabricating the other structure.

(Production of Sheet)

A method for producing the sheet is not particularly limited, and any known producing method can be used. Examples includes a solvent cast method in which the material is dissolved in a solvent and cast; an extrusion molding method in which the material is kneaded in a solid state, and extruded into a sheet through a die or the like; a calender method in which the material is kneaded in a solid state, and formed into a sheet with calender rolls; and a press mold method in which the material is formed into a sheet with a press or the like. In the present invention, the extrusion molding method is preferable in terms of properties such as production stability and processibility.

(Stretching)

A stretching method is not particularly limited, and any known method can be used, including, for example, tenter stretching, and roll press stretching. In the present invention, because the refractive index must be controlled to obtain birefringence, it is preferable to uniaxially stretch the sheet using roll stretching or tenter stretching, because these methods enable the refractive index to be readily controlled, and the sheet to be uniformly stretched.

(Fabrication of Prism Configuration)

For example, when fabricating the columnar prism configuration before stretching the sheet, it is preferable to use a transfer method in which the sheet is pressed against an engraved roller that has its stamp structure for the columnar prisms cut parallel to its rotation direction.

In this case, when the sheet is molded of polymer material, the prism configuration can be fabricated by pressing the sheet against the engraved roller immediately after molding and before curing. Alternatively, when using a cured sheet, the prism configuration can be fabricated by bringing the sheet into contact with the engraved roller that has been heated beforehand, with the polymer sheet maintained in a heat-press state. Of these methods, the method in which the polymer sheet is pressed against the engraved roller immediately after molding and before curing is preferable in terms of ease of transfer.

When fabricating the prism configuration after stretching the sheet, any known method can be used, including, for example, physical microcutting techniques such as laser cutting and nanomechanical cutting.

When stretching the polymer sheet after fabricating the prism configuration, the sheet can be rendered optically anisotropic (birefringent) by being stretched along the column direction of the fabricated prisms, without disrupting the transferred prism configuration. Thus, it is preferable in terms of ease of manufacture that the prism sheet used for a polarizing element of the present invention be stretched along the prism column direction after fabricating the prism configuration, so that, when a material with positive refractive index anisotropy is used, the slow axis of the prism sheet preferably will be substantially parallel to the column direction of the prisms, and that, when a material with negative refractive index anisotropy is used, the slow axis of the prism sheet preferably will be substantially perpendicular to the column direction of the prisms (the fast axis is substantially parallel to the column direction of the prism sheet).

(Fabrication of Convex Structures)

When using the prism sheet having a plurality of convex structures of a curved cross section, the convex structures can be fabricated as with the prism configuration. For example, the convex structures may be fabricated using an engraved roller that has its stamp structure for the convex structures cut parallel to its rotation direction, or physical microcutting techniques such as laser cutting and nanomechanical cutting.

When stretching the polymer sheet after fabricating the convex structures, the sheet can be rendered optically anisotropic (birefringent) by being stretched along the column direction of the fabricated convex structures, without disrupting the transferred convex structures. Thus, it is preferable in terms of ease of manufacture that the prism sheet having a plurality of convex structures of a curved cross section be stretched along the column direction of the convex structures after fabricating the convex structures, so that, when a material with positive refractive index anisotropy is used, the slow axis of the prism sheet preferably will be substantially parallel to the column direction of the convex structures, and that, when a material with negative refractive index anisotropy is used, the slow axis of the prism sheet preferably will be substantially perpendicular to the column direction of the convex structures (the fast axis is substantially parallel to the column direction of the prism sheet).

Further, in manufacture of the prism sheet having a plurality of convex structures of a curved cross section, the prism configuration and the convex structures may be formed simultaneously. In this case, the prisms and the convex structures can be formed at once using two engraved rollers respectively having the stamp structures for the columnar prisms and the columnar convex structures cut parallel to the rotation directions of these rollers, and by disposing these rollers in such a manner that a sheet molded of a polymer material passes between these rollers.

[Optically Transparent Resin Layer]

The optically transparent resin layer forming a polarizing element of the present invention is optically isotropic, and has a refractive index substantially the same as the fast-axis refractive index of the prism sheet, and coats the prism of the prism sheet. Because the refractive index of the optically transparent resin layer is substantially the same as that of the prism sheet along the fast axis, a reflective polarization separating characteristic can be realized in which no refraction occur for the p-polarized light component propagating through the prisms, and in which the s-polarized light component is retroreflected by the prisms.

As used herein, "substantially the same" means a refractive index difference of 0.05 or less, preferably 0.03 or less, and further preferably 0.01 or less. The polarization separating characteristic of the polarizing element can be improved as the difference between the fast-axis refractive index of the prism sheet and the refractive index of the optically transparent resin layer is decreased.

It is preferable that the surface of the optically transparent resin layer coating the prisms be flat. With the flat surface, the s-polarized light component reflected by the prisms is totally reflected at the interface between the optically transparent resin layer and air, and returns to the incident side. That is, the surface of the optically transparent resin layer has a role in realizing the reflective polarization separating characteristic. In the case where the interface between the prism-side optically transparent resin layer and air (the surface of the optically transparent resin layer on the prism side of the polarizing element) has raised portions or the like created by an anti-glare or other treatment, or by a dispersed state of inorganic fillers, the incident light on the polarizing element undergoes diffuse reflection at the interface between the optically transparent resin layer and air, making it difficult to obtain retroreflectivity.

Further, in a polarizing element of the present invention, it is preferable that the surface of the optically transparent resin layer coating the prism sheet (the surface of the optically transparent resin layer on the prism side of the polarizing element) be substantially parallel to the plane of the prism sheet including the slow axis and the fast axis. In this way, the optical characteristic for the light that has passed through the prism sheet and transmitted or reflected upon reaching the air interface through the optically transparent resin layer can be uniformly maintained over the surface.

Further, the optically transparent resin forming an optically transparent resin layer of the present invention is required to have little absorption, or essentially no absorption, in the visible range. Specifically, in the wavelength range of from 400 nm to 800 nm, inclusive, the optically transparent resin, when it is a 100 µm thick film, must have a transmittance of 80% or more, preferably 85% or more, and further preferably 90% or more for the light passing through the film.

Further, it is preferable that the optically transparent resin forming an optically transparent resin layer of the present invention have desirable adhesion to the prism surface of the prism sheet.

Further, the optically transparent resin layer must be optically isotropic. When the optically transparent resin layer has birefringence, the refractive index of the optically transparent resin layer cannot easily be controlled to be substantially the same as the refractive index of the prism sheet along the fast axis. Further, the p-polarized light component that has passed through the prism sheet will be affected by the birefringence of the optically transparent resin layer, and the characteristic of the linearly polarized light may be changed. For this reason, the optically transparent resin forming an optically transparent resin layer of the present invention is preferably made of materials that show little birefringence. Examples include thermoplastic resin, and heat- or light-curable resin. In terms of processibility, the curable resin is more preferable because, for example, it can be applied to the prism sheet and quickly cured.

Examples of thermoplastic resin usable for an optically transparent resin layer of the present invention include: acrylic resins such as poly(methylmethacrylate); polyolefins such as polyethylene; polyesters such as polyethylene terephthalate; polyethers such as polyphenylene oxide; vinyl resins such as polyvinyl alcohol; polyurethanes; polyamides; polyimides; epoxy resins; copolymers of two or more monomers of these; and non-birefringent polymer blends such as an 82:18 weight ratio mixture of poly(methylmethacrylate) and polyvinyl chloride, a 65:35 weight ratio mixture of poly(methylmethacrylate) and polyphenylene oxide, and a 77:23 weight ratio mixture of a styrene.maleic acid anhydride copolymer and polycarbonate.

A representative example of a curable resin usable for an optically transparent resin layer of the present invention is a crosslinked resin that is cured by a crosslinking reaction or the like in response to external excitation energy. Examples of the curable resin include active ray-curable resins that are cured by irradiation of active rays such as ultraviolet light and electron rays, and heat crosslinked resins that undergo crosslinking reaction in response to heat. Either resin is usable in the present invention.

A representative example of the active ray-curable resin usable for an optically transparent resin layer of the present invention is an ultraviolet light curable resin. Specific examples include: ultraviolet light-curable polyester acrylate resin; ultraviolet light-curable acrylic urethane resin; ultraviolet light-curable methacrylic acid ester resin; ultraviolet light-curable polyester acrylate resin; and ultraviolet light-curable polyol acrylate resin. Among these examples, the ultraviolet light-curable polyol acrylate resin is preferable in terms of process stability. Preferable examples of the photopolymerizable monomer (oligomer) include trimethylolpropane triacrylate, ditrimethylolpropane tetraacrylate, pentaerythritol triacrylate, pentaerythritol tetraacrylate, dipentaerythritol pentaacrylate, dipentaerythritol hexaacrylate, and alkyl-modified dipentaerythritolpentaerythritol.

The electron ray curable resin usable for an optically transparent resin layer of the present invention may be, for example, a resin having an acrylate functional group. Specific examples are relatively low-molecular-weight resins, including polyester acrylate resin, polyether acrylate resin, acrylic acrylate resin, epoxy acrylate resin, urethane acrylate resin, and polybutadiene acrylate resin.

Examples of the heat curable resin usable for an optically transparent resin layer of the present invention include epoxy resin, phenoxy resin, phenoxyether resin, phenoxyester resin, acrylic resin, melamine resin, phenol resin, urethane resin, and a mixture of these.

[Producing Method of Optically Transparent Resin Layer]

The optically transparent resin layer for a polarizing element of the present invention preferably can be produced by a method in which an optically transparent resin material is applied on the prism surface, and, optionally, the convex structure surface of the prism sheet. The application method is not particularly limited, and any known methods can be used, including, for example, spray coating, dip coating, spray flow coating, gravure coating, screen coating, bar coating, die coating, and lip coating. The gravure coating, screen coating, bar coating, die coating, and lip coating are among the preferable methods, because these methods enable the film thickness to be easily controlled within a range of from 1 µm to 100 µm, inclusive.

[Use of Polarizing Element]

A polarizing element of the present invention can be used as a reflective polarizing element. The efficiency of using light can be improved by disposing a reflective polarizing element of the present invention on the side of a liquid crystal panel of the construction in which a liquid crystal cell is sandwiched between polarizing plates such as dichroic polarizing elements, opposite from an observer (i.e., on the backlight side). This improves the brightness, and reduces the power consumption of the product liquid crystal display device. A polarizing element of the present invention is usable for all types of liquid crystal modes, such as the twist nematic mode, the vertically aligned mode, the OCB (Optically Compensated Bend) aligned mode, and the in-plane switching mode, that use a backlight and dichroic polarizing elements such as in the TFT liquid crystal display device.

Further, a polarizing element of the present invention is usable as a polarization separating element for liquid crystal projectors, one type of liquid crystal display device. When using a polarizing element of the present invention in a liquid crystal projector, the polarizing element can selectively take out only one of the s-polarized and p-polarized light components by being disposed between a light source and an RGB liquid crystal display panel.

Further, by being laminated on other optical layers having optical functions, a polarizing element of the present invention can be used as an optical component that exhibits a variety of functions. An example of a laminatable optical layer having an optical function is an absorptive polarizing element. As used herein, the "absorptive polarizing element" refers to polarizing elements that absorb polarized light of one direction while transmitting polarized light oriented 90° with respect to this direction. An example is a thermoplastic resin film in which a dichroic pigment or the like is orientationally dispersed.

Another example of the laminatable optical layer is a retardation layer. As used herein, the "retardation layer" is a layer that imparts a phase difference. An example is a retardation film produced by stretching a transparent thermoplastic synthetic polymer film. Another example of the retardation layer is a layer of birefringent material, having an optical axis oriented in a direction normal to a coating layer formed thereon, and in which the reflection wavelength of positive retardation wavelength dispersion characteristics falls within the ultraviolet region. The layer may be, for example, a twist-aligned polymeric chiral nematic (cholesteric) liquid crystal layer; a homeotropic-aligned polymeric discotic liquid crystal layer; a layer coated with a material that exhibits retardation in a direction normal to the coating layer formed thereon; or a retardation layer of a hybrid structure in which index ellipsoids are radially disposed in the thickness direction. A polarizing element of the present invention can be combined with any of these layers. Combined with these retardation layers, a polarizing element of the present invention can provide a circularly polarizing film or an elliptically polarizing film can be provided.

EXAMPLES

The following will describe the present invention in more detail based on Examples. It should be noted, however, that the description below does not limit the present invention in any ways, so long as it falls within the scope of the invention.
<Measurement and Evaluation Methods>
In the Examples, measurements and evaluations were conducted with regard to the following items, according to the methods described below.
[Refractive Index]
Refractive index was measured using an abbe refractometer (Atago Co., Ltd.; commercially available as Abbe Refractometer NAR-4T). The refractive index of the birefringent material was measured along the fast axis and the slow axis with linearly polarized light incident parallel to the optical axis using a polarizing plate for the light source.
[Light Transmittance T]
Spectral transmittance t(λ) was determined at the intervals of 10 nm in a wavelength range of 400 nm to 700 nm, inclusive, using a spectrophotometer (Hitachi; Model U-4000). From the result of measurement, light transmittance T was calculated according to Equation (1) below. In the equation, P(λ) is the spectral distribution of standard light (C light source), and y (λ) is the color matching function based on the 2-degree field of view XYZ system.

[Equation 1]

$$T = \frac{\int_{400}^{700} P(\lambda) \cdot y(\lambda) \cdot t(\lambda) d\lambda}{\int_{400}^{700} P(\lambda) \cdot y(\lambda) d\lambda} \quad (1)$$

[Degree of Polarization P]
Two types of light transmittance were measured using an absorptive polarizing element (Sanritz; commercially available as HLC2-2518; degree of polarization, 99.9) as one of the polarizing elements, and a polarizing element of the present invention as the other polarizing element. The absorptive polarizing element was disposed on the light source side of a spectrophotometer (Hitachi; Model U-4000), and the polarizing element of the present invention was disposed on the detector side. The degree of polarization P was calculated according to Equation (2) below, based on transmittance Tp (para-nicol transmittance), in which the transmission axes of the two polarizing elements coincide, and transmittance Tc (crossed nicole transmittance), in which the transmission axes of the two polarizing elements are orthogonal to each other. As used herein, the "transmission axis" refers to the azimuth in which the transmittance of the perpendicularly incident linearly polarized light through the polarizing element is at the maximum.

[Equation 2]

$$P = \sqrt{\frac{Tp - Tc}{Tp + Tc}} \times 100 \quad (2)$$

[Thickness]
The thicknesses of the prism sheet and the polarizing element were measured using an electronic micrometer (Anritsu).
[Size of Prisms and Convex Structures]
The prism sheet was freeze fractured to provide a cross section of the prisms or convex structures. The shape of the cross section was observed with a microscope (Keyence digital microscope VHX-500), and the size of the prisms or convex structures was measured.
[Rate of Brightness Increase]
Brightness was measured in a direction normal to a liquid crystal display device screen, using a luminance meter (Minolta; Model LS-110). The measurement was made with and without the polarizing element for the liquid crystal display element, and an increase in brightness due to the provision of the polarizing element was calculated.

Example 1

Synthesis of Polyethylenenaphthalate 100 parts by mass of 2,6-naphthalene dicarboxylic acid dimethylester, and 60 parts by mass of ethylene glycol were used to perform an ester exchange reaction according to an ordinary method, using 0.03 parts by mass of cobalt acetate tetrahydrate as an ester exchange catalyst. The ester exchange reaction was essentially terminated by adding 0.023 parts by mass of trimethyl phosphate. Then, 0.024 parts by mass of antimony trioxide was added to perform a polycondensation reaction at high temperature and under high vacuum according to an ordinary method. As a result, polyethylenenaphthalate having an inherent viscosity of 0.62 dL/g (as measured at 35° C. in a phenol/tetrachloroethane mixed solvent; 1:1 mass ratio) was obtained.
[Production of Film]
A pellet of the polyethylenenaphthalate obtained as above was dried at 180° C. for 3 hours, and fed to an extruder hopper. The pellet was melted at a melt temperature of 300° C., and the molten polymer was extruded through a 9.0-mm slit die onto a rotary cooling drum having a surface temperature of 40° C., so as to obtain a polyethylenenaphthalate unstretched film.
[Fabrication of Prism Configuration]
As a mold, a nickel plate having continuous patterns of equilateral triangular columns (52 μm on each side) over its surface was used. The mold was heated to 270° C., and the unstretched film was pressed against the mold to press transfer the mold patterns. As a result, columnar equilateral triangular prisms (52 μm on each side) were continuously formed on the surface of the polyethylenenaphthalate film.
[Stretching (Production of Prism Sheet)]
The polyethylenenaphthalate film with the prisms was uniaxially stretched along the column direction of the columnar triangular prisms at a stretch temperature of 125° C. and a stretch rate of 3.0. The film was then heat fixed at 230° C. for 10 seconds to obtain a prism sheet. The prism sheet had a thickness of 240 μm, and each side of the slanted surface of the equilateral triangle on the prism cross section was 30 μm. The sheet surface had continuous prism structures. The refractive index of the prisms was 1.81 along the column direction, and 1.55 along a direction perpendicular to the column direction.

[Production of Optically Transparent Resin Layer]

As the optically transparent resin, 100 parts by mass of an ultraviolet light curable resin (Toagosei Co., Ltd., commercially available as Aronix M110) was used. Sequentially, 3 parts by mass of a photopolymerization initiator (Ciba-Geigy, commercially available as Irgacure 184), and 10 parts by mass of 1-methyl-2-propanol (diluent) were added to the resin, and agitated until a homogenous coating liquid was obtained.

Figure 5:
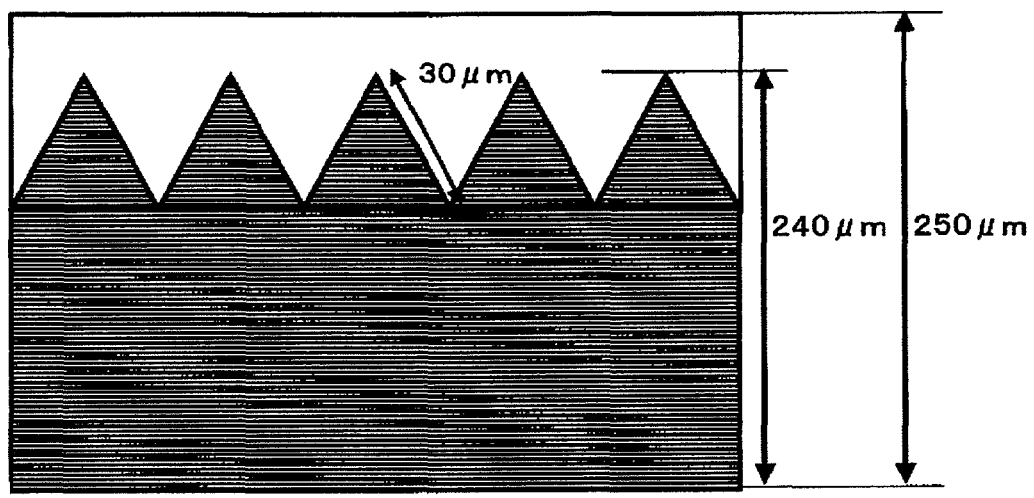
FIG. 5 is a cross sectional view of a polarizing element obtained in Example 1.

The coating liquid obtained as above was uniformly coated over the prism structure portion of the prism sheet to cover the prism structures, using a bar coater. The optically transparent resin layer was then cured by irradiation of ultraviolet light using a high-pressure mercury lamp. The layer was maintained in a 65° C. oven for 10 minutes to evaporate the diluent solvent component 1-methyl-2-propanol and obtain a polarizing element. The polarizing element had a thickness of 250 μm, and the refractive index of the optically transparent resin layer was 1.55. The cross section of the polarizing element is shown in FIG. 5.

[Measurement and Evaluation]

The polarizing element had a light transmittance of 44%, and a degree of polarization of 95.3%, confirming the polarized light separation performance of the polarizing element.

[Production of Liquid Crystal Display Device]

A liquid crystal display device of the construction below was produced using the polarizing element obtained as above, and a commercially available transmissive liquid crystal display device. The polarizing element of the present invention was disposed so that its transmission axis coincided with the transmission axis of an absorptive polarizing element disposed adjacent to the polarizing element.

Construction:

Absorptive polarizing element/retardation film/liquid crystal cell/retardation film/absorptive polarizing element/polarizing element (the present invention)/prism sheet/prism sheet/diffusion film/backlight/white reflecting film The rate of brightness increase was determined by measuring normally white brightness before and after inserting the polarizing element. The result confirmed an 18% brightness increase.

Example 2

Production of Film

A pellet of the polyethylenenaphthalate obtained in Example 1 was dried at 180° C. for 3 hours, and fed to an extruder hopper. The pellet was melted at a melt temperature of 300° C., and the molten polymer was extruded through a 9.0-mm slit die onto a rotary cooling drum having a surface temperature of 40° C., so as to obtain a polyethylenenaphthalate unstretched film.

[Fabrication of Prism Configuration and Convex Structures]

Two types of mold were fabricated by cutting a nickel plate having continuous patterns of equilateral triangular columns (52 μm on each side) disposed in parallel over its surface, and a nickel plate, used to obtain lenticular lens-like convex portions, and that has semi-elliptic columns (23 μm in height, and 52 μm in width as measured in the cross section) continuously disposed in parallel over its surface. The molds were heated to 270° C., and, for press transfer, the unstretched film was sandwiched between the molds, with the column directions of the mold patterns oriented in the same direction. As a result, columnar equilateral triangular prisms (52 μm on each side) were continuously formed on one surface of the polyethylenenaphthalate film, and lenticular lens-like convex structures were continuously formed on the other surface of the polyethylenenaphthalate film.

[Stretching (Production of Prism Sheet)]

The polyethylenenaphthalate film with the prisms was uniaxially stretched along the column directions of the columnar triangular prisms and the convex structures at a stretch temperature of 125° C. and a stretch rate of 3.0. The film was then heat fixed at 230° C. for 10 seconds to obtain a prism sheet. The prism sheet had a thickness of 230 μm, and each side of the slanted surface of the equilateral triangle on the prism cross section continuously formed on one surface was 30 μm. The lenticular lens-like convex structures continuously formed on the other surface were 13 μm in height and 30 μm in width. The refractive index of the prisms was 1.80 along the column direction, and 1.55 along a direction perpendicular to the column direction.

[Production of Optically Transparent Resin Layer]

As the optically transparent resin, a coating liquid was obtained as in Example 1.

Figure 6:
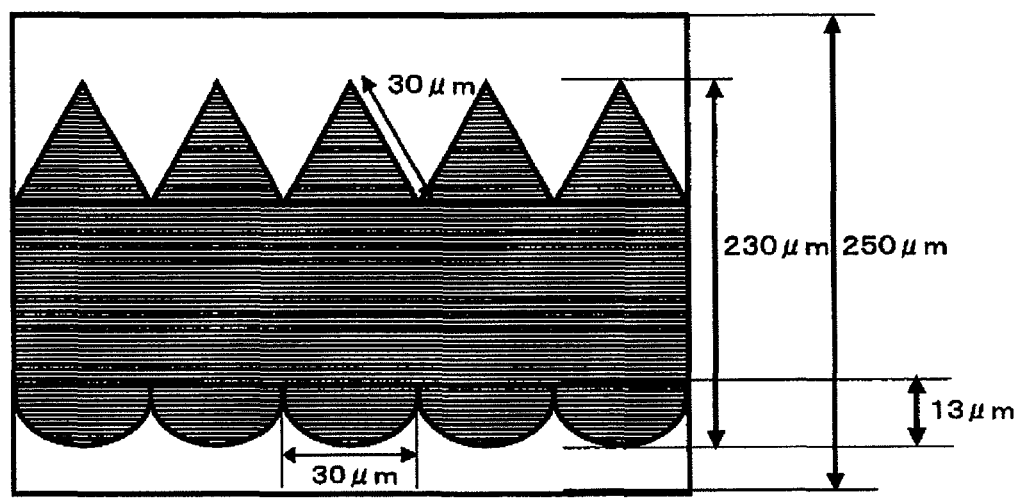
FIG. 6 is a cross sectional view of a polarizing element obtained in Example 2.

The coating liquid obtained as above was uniformly coated over the prism structure portion of the prism sheet to cover the prism structure, using a bar coater. The optically transparent resin layer was then cured by irradiation of ultraviolet light using a high-pressure mercury lamp. The film was flipped over, and the coating liquid was uniformly coated in the same manner over the surface having the convex structure columns, using a bar coater, so as to cover the convex structures. This was followed by irradiation of ultraviolet light using a high-pressure mercury lamp. The film with the optically transparent resin layers formed on the both surfaces was maintained in a 65° C. oven for 10 minutes to evaporate the diluent solvent component 1-methyl-2-propanol and obtain a polarizing element. The polarizing element had a thickness of 250 μm, and the refractive index of the optically transparent resin layers was 1.55. The cross section of the polarizing element is shown in FIG. 6.

[Measurement and Evaluation]

The polarizing element had a light transmittance of 46%, and a degree of polarization of 90.3%, confirming the polarized light separation performance of the polarizing element.

[Production of Liquid Crystal Display Device]

A liquid crystal display device of the construction below was produced using the polarizing element obtained as above, and a commercially available transmissive liquid crystal display device. The polarizing element of the present invention was disposed so that its transmission axis coincided with the transmission axis of an absorptive polarizing element disposed adjacent to the polarizing element.

Construction:

Absorptive polarizing element/retardation film/liquid crystal cell/retardation film/absorptive polarizing element/polarizing element (the present invention)/prism sheet/prism sheet/diffusion film/backlight/white reflecting film The rate of brightness increase was determined by measuring normally white brightness before and after inserting the polarizing element. The result confirmed a 28% brightness increase.

The invention claimed is:

1. A polarizing element comprising a prism sheet and an optically transparent resin layer,
   wherein the prism sheet is a substantially uniaxial sheet having an in-plane optical axis, and includes a plurality of prisms of a polygonal cross section on at least one of its surfaces, wherein an angle made by a slanted surface of the prisms and a plane of the prism sheet including a slow axis and a fast axis is equal to or greater than a critical angle based on a slow-axis refractive index and a fast-axis refractive index of the prism sheet, wherein the optically transparent resin layer is optically isotropic, and has a refractive index substantially the same as the fast-axis refractive index of the prism sheet, where said substantially the same means a refractive index difference of 0.05 or less, and wherein the prisms are coated with the optically transparent resin layer.

2. The polarizing element according to claim 1, wherein the plurality of prisms of a polygonal cross section is formed on one surface of the prism sheet, and a plurality of convex structures of a curved cross section is formed on the other surface of the prism sheet, and wherein the prisms and the convex structures are coated with the optically transparent resin layer.

3. The polarizing element according to claim 2, wherein the convex structures are disposed substantially parallel to one another.

4. The polarizing element according to claim 2, wherein the convex structures are columnar.

5. The polarizing element according to claim 4, wherein the prisms and the convex structures have substantially the same column direction in the prism sheet.

6. The polarizing element according to claim 2, wherein the convex structures are a form of convex lenses.

7. The polarizing element according to claim 1, wherein the prisms are disposed substantially parallel to one another.

8. The polarizing element according to claim 1, wherein the prisms are columnar.

9. The polarizing element according to claim 8, wherein the slow axis of the prism sheet is substantially parallel to or substantially perpendicular to a column direction of the prisms.

10. The polarizing element according to claim 1, wherein the prisms have a triangular cross section.

11. The polarizing element according to claim 1, wherein a difference between the slow-axis refractive index and the fast-axis refractive index of the prism sheet is 0.15 or more.

12. The polarizing element according to claim 1, wherein a difference between the refractive index of the optically transparent resin layer and the fast-axis refractive index of the prism sheet is 0.05 or less.

13. The polarizing element according to claim 1, wherein the prism sheet is made of a thermoplastic resin.

14. The polarizing element according to claim 13, wherein the prism sheet is made of polyethylenenaphthalate.

15. The polarizing element according to claim 1, wherein a surface of the optically transparent resin layer coating the prisms is substantially parallel to the plane of the prism sheet including the slow axis and the fast axis.

16. The polarizing element according to claim 1, wherein the optically transparent resin layer is made of a curable resin.

17. A liquid crystal display device comprising a first polarizing plate, a liquid crystal cell, a second polarizing plate, and a light source, wherein the first polarizing plate, the liquid crystal cell, the second polarizing plate, and the light source are disposed in this order, wherein a polarizing element of claim 1 is disposed between the second polarizing plate and the light source, and wherein the fast axis of the prism sheet and a transmission axis of the second polarizing plate are disposed substantially parallel to each other.

* * * * *